United States Patent Office

3,507,845
Patented Apr. 21, 1970

3,507,845
PROCESS FOR PRODUCING ETHYLENE/VINYL CHLORIDE COPOLYMERS
Edwin D. Hornbaker, Baton Rouge, La., assignor to Ethyl Corporation, New York, N.Y., a corporation of Virginia
No Drawing. Continuation of application Ser. No. 235,545, Nov. 5, 1962. This application Jan. 19, 1967, Ser. No. 610,452
Int. Cl. C08f 1/60, 1/62, 1/74
U.S. Cl. 260—87.5                                    10 Claims

ABSTRACT OF THE DISCLOSURE

A vinyl chloride-ethylene copolymer having a chemically combined ethylene content of 9–22 percent by weight. The copolymer is characterized by having an inherent viscosity at 25° C. of at least 0.9 when dissolved in cyclohexanone at a concentration of 0.1 gram per 100 ml. The copolymer is prepared by copolymerizing vinyl chloride and ethylene at a temperature in the range of from about −25° C. to about 10° C. at a pressure ranging from about 2,000 to about 30,000 p.s.i., in the presence of a catalyst comprising the product of reaction between an organoborane and at least one member of the group consisting of molecular oxygen and peroxides. Example of a suitable catalyst is the product of reaction between a trialkyl borane and molecular oxygen.

---

This is a continuation of application Ser. No. 235,545 filed Nov. 5, 1962.

Novel vinyl chloride-ethylene copolymers and their production form the objectives of this invention.

Polyvinyl chloride is a widely used commercial plastic material. The pure polymer is relatively brittle and as a consequence it is normally compounded with a plasticizer. Unfortunately, however, plasticized polyvinyl chloride possesses a number of shortcomings. For example, with all but the most expensive plasticizers the polymer becomes exceedingly brittle when the temperature drops down to about −25° F. Furthermore, the commonly used plasticizers tend to migrate from or bleed out of the polymer or are often leached out when the polymer comes in contact with such common materials as soap and water, gasoline, other organic solvents, and the like. On top of this, many of the commonly used plasticizers tend to render the resultant plasticized polyvinyl chloride composition readily flammable and to impair its electrical resistivity. As a consequence, there is a distinct need in the art for a plastic material which possesses the beneficial properties of plasticized polyvinyl chloride but which does not suffer from its shortcomings.

In accordance with this invention a new type of vinyl chloride-ethylene copolymer is provided. This copolymer is characterized by containing from about 9 to about 22 weight percent of chemically combined ethylene, the balance being chemically combined vinyl chloride; and by having an inherent viscosity at 25° C. of at least about 0.9 (preferably from about 0.9 to about 2.0) when dissolved in cyclohexanone at a concentration of 0.1 gram per 100 ml. As is well known in the art, the inherent viscosity is a measure of the molecular weight of the polymer and therefore the foregoing inherent viscosities correspond in general to molecular weights ranging from about 75,000 to about 180,000.

The copolymers of this invention possess all of the beneficial properties of plasticized polyvinyl chloride but are superior thereto in a number of important respects. In the first place, the present copolymers are self-extinguishing polymeric materials—e.g., they do not support combustion even when exposed to an open flame. Secondly, the present polymers are less brittle at low temperatures than conventional plasticized polyvinyl chloride. In fact, the novel copolymers of this invention have shown ASTM brittle temperatures as low as −120° F. For purposes of comparison, plasticized vinyl chloride specimens representative of those in commercial use have been shown to have ASTM brittle temperatures of about −25° F.

Still another advantage of the present compositions is that it is unnecessary, though permissible, to utilize a plasticizer therewith. This in turn renders the present plastic compositions less expensive.

The present copolymers possess higher electrical resistivity and have a lesser tendency to become brittle on aging than platicized polyvinyl chloride. Also, the present copolymers are highly compatible with other polymers and resins, e.g., polystyrene, polyethylene, SBR, polyisobutylene, and the like. Consequently, the novel copolymers produced in accordance with this invention are well suited for various and sundry commercial uses.

A preferred embodiment of this invention relates to vinyl chloride-ethylene copolymers as described above in which the content of chemically combined ethylene ranges from about 9 to about 13 weight percent. These particular copolymers possess the surprising characteristic of being readily orientable—i.e., they can be hot-stretched so as to further increase their strength. The procedures for effecting such hot-stretching are well known to the art and for further details reference may be had to Modern Plastics Encyclopedia, p. 145 (1961). As an example of this unusual behavior, a copolymer of this invention composed of 12 weight percent of chemically combined ethylene and 88 weight percent of chemically combined vinyl chloride and having an inherent viscosity as measured above of 1.03 was found to have an ultimate tensile strength (ASTM D–412) of about 46,000 p.s.i. after being hot-stretched (200° F.) to a length six times its original length.

Another preferred embodiment of this invention involves vinyl chloride-ethylene copolymers as defined above in which the content of chemically combined ethylene is from about 15 to about 20 weight percent, the balance being chemically combined vinyl chloride. These particular polymers have ASTM brittle temperatures (ASTM D–746) of below about −50° F. Hence, these preferred copolymers are well suited to low temperature uses, uses to which even plasticized polyvinyl chloride itself is unsuited.

A feature of this invention is the importance of having from about 9 to about 22 weight percent of chemically combined ethylene in the copolymer. A substantial amount of experimental work has shown that if the ethylene content is lower than this amount the resultant copolymers possess virtually no flexibility even at room temperature. Rather, these low content ethylene copolymers (e.g., 2 percent—see U.S. 3,051,689) are brittle and tend to break very readily when subjected to a moderate flexing action.

Still another feature of this invention is the fact that a particularly unique process is utilized in producing the present copolymers. This process involves copolymerizing ethylene and vinyl chloride at a temperature in the range of about −25° C. to about 10° C. using pressures in the range of from about 2,000 to about 30,000 p.s.i. The polymerization catalyst used in this process is specific in its applicability and is the product of reaction between an organoborane and either molecular oxygen (e.g., air) or a peroxide (e.g., cumene hydroperoxide) in proportions equivalent to an atomic ratio, elemental boron-to-elemental oxygen, of from about 0.25:1 to about 15:1. The mole ratio of the ethylene and the vinyl chloride used in this process is in the range of from about 1:1 to about 4.5:1.

To prepare the vinyl chloride-ethylene copolymers in which the content of chemically combined ethylene ranges from about 9 to about 13 weight percent—i.e., the readily orientable polymers—the process described in the preceding paragraph is used with the exceptions that the pressures are kept in the range of from about 2,000 to about 15,000 p.s.i. and the mole ratio of ethylene to vinyl chloride is kept in the range of from about 1:1 to about 2.5:1. By the same token, the process described in the preceding paragraph can be used to prepare the copolymers in which the content of chemically combined ethylene is from about 15 to about 20 weight percent—i.e., the copolymers having ASTM brittle temperatures of below about −50° F.— by keeping the pressures in the range of from about 4,000 to about 30,000 p.s.i. and by keeping the mole ratio of ethylene to vinyl chloride in the range of about 2:1 to about 4.5:1.

As noted above, the foregoing process embodiments are specific in their applicability to the synthesis of the novel copolymers of this invention. As a matter of fact, significant departures from any of the foregoing conditions will result at the very best in copolymers having entirely different properties. Most of such departures result in polymers having markedly inferior properties. The use of the molecular oxygen or peroxide in formulating the present catalyst system is of considerable importance for still another reason. If this ingredient is omitted, the rate of polymerization is exceedingly slow. Consequently, by observing the combination of conditions specified above, the novel and highly useful copolymers of this invention are produced rapidly and in good yield.

A wide variety of organoboranes can be used in formulating the foregoing catalyst systems. Triorganoboranes, such as trialkyl boranes, tricycloalkyl boranes, triaryl boranes, triaralkyl boranes, trialkaryl boranes, and the like, are well suited although effective use can be made of organoboron hydrides such as those having the formula

RBH$_2$ and R$_2$BH wherein the R groups can be the same or different and are preferably hydrocarbon groups such as alkyl, cycloalkyl, aryl, aralkyl, and alkaryl radicals. Polymeric forms of borane such as diborane, tetraborane, pentaborane, hexaborane, and decaborane can also be used with success. The preferable organoboranes are the trialkyl boranes such as triethyl borane, tri-n-propyl borane, triisopropyl borane, the tributyl boranes, the trihexyl boranes, the trioctyl boranes, and the like.

The preparation of the polymerization catalysts utilized in accordance with this invention involves the formation of a reaction product between an organoborane, such as those described above, and either molecular oxygen or a peroxide compound, provided that the elemental boron-to-elemental oxygen atom ratio therein is from about 0.25:1 to about 15:1. In preparing such reaction products apt concentrations of the organoborane and oxygen-containing material selected for use are brought together preferably at low temperatures in the range of from about −78° C. up to about −50° C. To facilitate this reaction and simplify catalyst handling, it is preferable to utilize an inert solvent such as an ether, an ester, a ketone, a hydrocarbon, or a like material which is liquid at the temperatures just described. Of the such solvents the cheapest and most suitable are the aliphatic, cycloaliphatic, and aromatic hydrocarbons which remain in the liquid state of aggregation at the selected temperature of from about −78° C. to about −50° C., examples of these including cyclopentane, p - cymene, 2 - methylnonane, 2,3 - dimethylbutane, 2,2 - dimethylbutane, 2 - methylpentane, n - hexane, 3 - methylpentane, 3 - ethylpentane, 3,3 - dimethylpentane, 2,4 - dimethylpentane, 2,2 - dimethylpentane, n-heptane, toluene, and the like. After bringing the reactive materials together, preferably in the solvent, the entire system is preferably agitated to insure intimate contact between the reactants. Depending upon the degree of agitation being utilized, the time utilized to insure reaction of the organoborane with substantially all of the available oxygen will range from about 5 minutes to about 6 hours. In most instances, it is preferable to provide a residence time or reaction period of from about 0.5 to about 1.5 hours. Thereupon, the catalyst is charged into the polymerization vessel or zone and is in a form suitable for effecting the novel copolymerization reactions of this invention.

When utilizing air or oxygen as the oxygen-containing reactant, the catalyst preparation procedure is simplified if the vessel in which the catalyst is to be prepared is an autoclave or similar sealable device from which all air can be evacuated after charging therein the organoborane and, if used, the solvent. Thereupon, a metered amount of air or oxygen gas can be readily introduced into the system so as to insure the preparation of a catalyst containing the requisite ratio of boron-to-oxygen.

In order to demonstrate the practice and advantages attendant this invention, an extensive series of experimental runs was conducted. In these experiments several procedures were utilized. One procedure identified below as Procedure A was as follows:

A catalyst solution was prepared by adding to a cold solution (approximately −78° C.) of 2.5 grams of triethylborane in 10 ml. of heptane in a closed stainless steel container a sufficient quantity of air to provide 0.198 gram of oxygen. The solution was allowed to stand at about −78° C. with periodic agitation for one hour before being used. (In a few cases, 30 ml. of heptane were employed and the procedure was designated A–1.)

A cold 1-liter autoclave was charged with the desired quantity of cold vinyl chloride (200 to 400 grams, depending upon the ethylene to vinyl chloride desired), and while cooling in a Dry Ice-acetone mixture to maintain the temperature at about −78° C. the autoclave was evacuated. It was then placed in a constant temperature bath and allowed to warm up somewhat while agitating. The catalyst solution was then charged and the autoclave was pressurized with ethylene. During the pressurizing operation, the autoclave came to the desired reaction temperature. The quantity of ethylene charged was calculated from the volume of free space in the autoclave before charging and from the density, this latter quantity being given by the temperature and pressure at the completion of charging. Agitation was continued for the desired reaction period, at the end of which the autoclave was vented. The polymer formed was chopped in a Waring Blendor with methanol, filtered and dried at 50° C.

Procedure B involved the following steps:

A catalyst solution was prepared in the same manner as in Procedure A except that after the 1-hour period the cold container was evacuated to remove any unreacted air. A cold high pressure autoclave containing the desired quantity of vinyl chloride was cooled to about −78° C. in a Dry Ice-acetone mixture and the autoclave was evacuated. The autoclave was transferred to a constant temperature jacket, the catalyst solution was charged, agitation was started, and the reactor was pressurized with ethylene. The autoclave warmed up sufficiently for appreciable polymerization to start within 1 hour or less as indicated by a pressure drop. Agitation was continued for the desired reaction period, at the end of which the autoclave was vented. The quantity of ethylene charged was calculated in the same way as in Procedure A. The polymer was chopped in a Waring Blendor with methanol, filtered and dried at 50° C.

Another technique—Procedure C—was as follows:

A cold 500 ml. high pressure autoclave containing the desired amount of cold vinyl chloride maintained at about −78° C. in a Dry Ice-acetone bath was evacuated, a solution of 1.25 grams triethylborane in 10 ml. of heptane was charged and a quantity of air sufficient to provide 0.102 gram of oxygen was added. The autoclave was transferred to a constant temperature jacket, agitation was started and the autoclave was pressurized with ethylene. The autoclave had warmed up sufficiently for polymerization to start within 1–1.5 hours. Agitation was continued for the desired reaction period at the end of which the autoclave was vented. The polymer was chopped in a Waring Blendor with methanol filtered and dried at 50° C.

The results of these examples and the particular conditions used are more fully described in Table I.

and 50 percent relative humidity. Under these conditions the copolymer had a water vapor permeability of only 0.3 to 0.5 gram per 100 square inches of surface per mil of thickness per 24 hours. This is an extremely low degree of water vapor permeability, especially in view of the finding (Plastics World, page 46 (April 1961)) that under generally similar conditions a sample TABLE I.—COPOLYMERIZATION OF VINYL CHLORIDE AND ETHYLENE TO PRODUCE VINYL CHLORIDE-ETHYLENE COPOLYMERS OF THIS INVENTION

| Example | Experimental procedure | Temp., °C. | Reaction time, hr. | Ethylene/vinyl chloride molar ratio | Pressure, p.s.i. × 10⁻³ | Conversion, percent | Percent ethylene in copolymer | $\eta$inh [1] |
|---|---|---|---|---|---|---|---|---|
| 1 | A | 4–8 | 4 | 2.4 | 3.0–3.5 | 12 | 9.7 | 1.15 |
| 2 | A | −17--16 | 2 | 2.4 | 3.1–3.2 | 8 | 9.9 | 1.34 |
| 3 | A | 0–6 | 3 | 2.4 | 2.9–3.0 | 7 | 10.4 | 1.10 |
| 4 | A | 2–6 | 3 | 1.9 | 2.5–2.9 | 9 | 10.8 | 1.38 |
| 5 | A | −17--15 | 3 | 1.5 | 3.1–3.3 | 10 | 10.4 | 1.70 |
| 6 | A | 4–6 | 4 | 1.5 | 1.8–3.0 | 17 | 10.6 | 1.33 |
| 7 | A-1 | 3–10 | 4 | 1.4 | 1.4–3.0 | 31 | 10.1 | 0.97 |
| 8 | A | 5–8 | 4 | 1.5 | 1.5–3.0 | 30 | 11.1 | 1.28 |
| 9 | A | 1–6 | 4 | 1.9 | 1.6–3.0 | 25 | 12.9 | 1.10 |
| 10 | A | 2–6 | 4 | 2.4 | 2.0–3.0 | 20 | 13.4 | 0.95 |
| 11 | B | −20–0 | 1.5 | 2.4 | 12.0–13.0 | 17 | 16.1 | 0.90 |
| 12 | A-1 | 1–5 | 4 | 4.2 | 4.5–5.2 | 6 | 18.9 | 1.10 |
| 13 | C | −10–5 | 2 | 2.7 | 13.5–16.5 | 20 | 20.1 | 1.23 |
| 14 | C | −10–2 | 2.5 | 2.8 | 11.6–13.8 | 19 | 20.1 | 0.94 |
| 15 | B | −20–0 | 2 | 2.4 | 12.0–14.3 | 21 | 21.4 | 0.98 |
| 16 | B | −10–6 | 2 | 3.3 | 29–30 | 5 | 21.0 | 0.95 |

[1] Inherent viscosity at 25° C. when dissolved in cyclohohexanone to a concentration of 0.1 gram per 100 ml.
In Examples 12–14, inclusive, the concentration of the triethylborane-oxygen catalyst was 0.14 mole percent based on total moles of ethylene plus vinyl chloride charged. In other examples the concentration was 0.10 mole percent.
In Examples 1–16, inclusive, the boron-to-elemental oxygen atomic ratio was 2–1.

It will be seen from Table I that a wide variety of novel copolymers of this invention were produced in relatively short polymerization times and in good conversions. Each of the copolymers so produced possessed the characteristics of the polymers of this invention as discussed hereinabove.

To further demonstrate the excellent properties of the copolymers of this invention, the results of a number of standard evaluation procedures are presented below. In general, these experiments involved measuring important physical properties not only of various copolymers of this invention but of vinyl chloride-ethylene copolymers not of this invention—i.e., copolymers which contain less than about 9 percent of chemically combined ethylene. In addition, comparisons were made between the physical properties of copolymers of this invention and commercially available plasticized polyvinyl chloride samples.

In one series of such tests, measurements were made of the ultimate tensile strength, ultimate elongation, brittle temperature, volume resistivity, and flame resistance. The results of such tests are shown in Table II.

of plasticized polyvinyl chloride (i.e., plasticized PVC) had a water vapor permeability of 8.0 grams per 100 square inches per mil per 24 hours.

As noted above, another embodiment of this invention relates to the surprising discovery that the vinyl chloride-ethylene copolymers of this invention in which the content of chemically combined ethylene ranges from about 9 to about 13 weight percent can be hot-stretched so as to further increase their strength. This process involves heating the copolymer to a temperature of from about 100 to about 275° F. and preferably from about 150 to about 240° F., and stretching the so heated copolymer to from about 1.5 to about 10 times its original length and preferably from about 2 to about 8 times its original length. Thereupon, the copolymer is cooled while in the stretched condition and found to possess an increased tensile strength. Such hot-stretching can involve uniaxial hot-stretching—i.e., stretching of the copolymer sample in one direction only. On the other hand, the hot-stretching can be effected on a biaxial basis whereby sequentially or preferably concurrently the sample is hot- TABLE II.—PHYSICAL PROPERTIES OF COPOLYMERS OF THIS INVENTION AS COMPARED WITH POLYMERS NOT OF THIS INVENTION

| Composition [1] | Tensile strength, p.s.i.[2] | Ultimate elongation,[2] percent | Brittle temperature,[3] °F. | Flame resistance | Volume resistivity, ohm-cm. |
|---|---|---|---|---|---|
| 88–12 vinyl chloride-ethylene copolymer | 4,000 | 105 | −57 | Non-burning | >10¹⁶ |
| 80–20 vinyl chloride-ethylene copolymer | 2,810 | 490 | −120 | do | |
| 96–4 vinyl chloride-ethylene copolymer | 4,250 | 36 | 68 | do | |
| 71–29 PVC, dioctylphthalate | 3,530 | 300 | −7 | Burns | 4.8×10¹³ |
| 67–33 PVC, dioctylphthalate | 2,600 | 230 | −25 | do | |

[1] Composition in weight percent.
[2] ASTM D-412
[3] ASTM D-746
[4] ASTM D-257

Another advantageous property possessed by the copolymers of this invention is their impermeability or exceedingly low permeability with respect to such materials as water, water vapor, and the like. This valuable property renders the copolymers well suited for use in packaging applications such as food wrappers and the like. As an example of this behavior, a copolymer of this invention containing 90 weight percent of chemically combined vinyl chloride and 10 weight percent of chemically combined ethylene was subjected to a test to determine the water vapor permeability thereof at 77° F. stretched in two directions at right angles to each other. In both cases, the strength of the hot-stretched copolymer of this invention is increased as compared with its original strength.

The novel copolymers and polymerization process of this invention should not be confused with copolymers and copolymerization procedures referred to heretofore in the art. So far as is known and can be determined, vinyl chloride-ethylene copolymers having commercially attractive properties were not prepared by previously-known procedures. It follows therefore that the copolymers of this invention and their novel method of preparation are without precedent in the prior art. By way of example, an extensive series of experiments was conducted wherein prior art procedures for the preparation of vinyl chloride-ethylene copolymers were repeated as closely as possible in order to determine the characteristics of these previously reported copolymers. The results of these experiments are summarized in Table III.

Certain other references to ethylene-vinyl chloride copolymers appear in the prior art but were not repeated because in these instances the reported experimental work shows on its face that the resultant copolymers were entirely different from the inferior to those of the present invention. For example, Belgian Patent 592,191, Examples 1 and 2, describe the product as a viscous mass. Example 4 of that patent describes a yellow liquid and

TABLE III.—PROPERTIES OF PRIOR ART VINYL CHLORIDE-ETHYLENE COPOLYMER

| Reference | Patent Example No. (or procedure) | $\eta$ inh | Percent $C_2H_4$ in polymer | Polymer properties |
|---|---|---|---|---|
| U.S. 2,497,291 | 1 | 0.53 | 32.7 | Weak, tacky, colorless. |
|  | 2 | 0.43 | 26.0 | Do. |
|  | 2 | 0.46 | 28.3 | Do. |
|  | 3 | No product obtained | | |
|  | 4 | 0.29 | 7.1 | Brittle, colorless. |
| U.S. 2,422,392 | 1 | 0.40 | 47.7 | Weak, tacky, yellow. |
|  | 2 | 0.40 | 61.0 | Weak, rubbery, brown |
|  | 3 | 0.50 | 2.3 | Brittle, highly colored moldings. |
| U.S. 2,388,225 | 5 | 0.70 | 44.4 | Weak, rubbery, orange, |
|  | 6 | [1] 0.66 | 53.3 | Weak, possibly heterogeneous. |
| U.S. 2,396,677 | 11 | 0.53 | 40.3 | Weak, tacky, tan. |
| Belgian 592,191 | 3 | 0.34 | 28.6 | Weak, colorless. |
| Australian 235,862 | 1 | [2] 0.001 |  | Trace yield of white powder. |
|  | 2 | No product obtained | | |
| Australian 235 125 | 1 | No product obtained | | |
|  | 2 | No product obtained | | |
| British 767,417 | 14 | 0.56 | 6.2 | White powder; brittle molding. |
|  | 14 | 0.56 | 6.2 | Do. |
| U.S. 2,985,633 | 14 | [1] 0.45 | ~100 | White powder; weak molding. |
|  | [3] 14 | [1] 0.49 | ~100 | White powder; brittle molding. |
|  | [4] 14 | [1] 0.46 | ~100 | Do. |
|  | [5] 14 | [1] 0.41 | ~100 | Do. |
| Belgian 605,181 | 6 | 0.81 | 3.0 | Do. |
|  | [6] 6 | 0.67 | 3.0 | Do. |
|  | [7] 6 | 0.65 | 9.9 | Do. |
| Vysokomolek, Soed.[8] | D | 0.25 | 8.5 | Do. |
|  | E | 0.13 | 45.5 | Tacky, viscous oil. |

[1] Determined in xylene at 100° C. Insoluble in cyclohexanone.
[2] The trace of material isolated does not, in view of the low viscosity, appear to be polymeric.
[3] Used 1.5 times the amount of vinyl chloride specified by Example 14.
[4] Used 3.75 times the amount of vinyl chloride specified by Example 14.
[5] Used 6.25 times the amount of vinyl chloride specified by Example 14.
[6] Ran at 700 p.s.i. ethylene pressure instead of the 570 p.s.i. specified by the procedure of Example 6.
[7] Ran at 950 p.s.i. ethylene pressure.
[8] H. S. Kolesnikov et at., Vysokomolek, Soed. 1, 627 (1959).

It will be seen from the above table that in conducting the copolymerizations taught by Kolesnikov et al., procedures identified as D and E were utilized. The actual experimental procedures so used were as follows:

PROCEDURE D

An 845 ml. high pressure reactor cooled to about −78° C. was charged with 170 grams of cold vinyl chloride and 165 grams of toluene. While continuing to maintain the temperature at about −78° C., the reactor was evacuated and a solution of 3.5 grams (2 weight percent on monomer) of triisobutylborane in 9 grams of toluene was added from a stainless steel cylinder. The reactor was pressurized with 500 p.s.i. of ethylene and allowed to warm with agitation during a 4.5 hour reaction period to 18° C., during which time the pressure was maintained at 500 p.s.i. by intermittent addition of ethylene. The reactor was vented and the toluene solution was concentrated and poured into methanol. The product was filtered and dried. The yield was 9 grams.

PROCEDURE E

Procedure D was repeated except that 45 grams of vinyl chloride were charged and the reactor was pressurized at about −78° C. to 800 p.s.i. with ethylene. During the 4.5 hours required for the reactor to warm to 18° C., the pressure rose to 6,000 p.s.i. About 2 grams of product were obtained by the workup method of Procedure D.

Reference to the information contained in Table III shows that all of the foregoing prior art procedures resulted in polymers which were entirely different from and inferior to the novel copolymers of this invention. By way of example, the inherent viscosities of all of these prior art copolymers were lower than those of the present invention, meaning that the prior art polymers had lower molecular weights. This in turn manifested itself in polymers having poor properties such as low tensile strength, brittleness, or the like. None of these prior art copolymers was suitable for use in applications to which the copolymers of this invention can be put.

Example 5 a viscous, sticky product. Similarly, Example 22 of U.S. 2,471,959 reports a copolymer having an inherent viscosity of but 0.48 which is characteristic of weak, tacky materials. The same holds true of Example 8 of British Patent 578,584 which reports an inherent viscosity of only 0.38. Therefore, so far as is known and can be determined, this invention is the first instance whereby novel and highly useful ethylene-vinyl chloride copolymers having the properties discussed above have been found capable of preparation and have been prepared.

In conducting the polymerization reaction of this invention, several techniques can be advantageously used. Hence, the process can be conducted as a bulk polymerization procedure, as a suspension procedure, as an emulsion process or as a solution polymerization. The general techniques applicable to these various procedures are well known to those skilled in the art and for further details reference may be had to Schildknecht, Polymer Processes, Interscience, New York, 1956, Chapters 2, 3, 4 and 5. Generally speaking, it is preferable to conduct the process of this invention either in bulk or via a suspension technique utilizing an aqueous or aqueous alcohol suspension medium. Moreover, the present process can be conducted on a batch, semi-batch or continuous basis, depending upon the mode of addition of the ingredients to the reaction zone.

Conventional polymer work up procedures are suitable for separating and recovering the polymer from the reaction system. Exemplary of these work up procedures are those described in Schildknecht, Polymer Processes, Interscience, New York, 1956.

Examples of the organoboranes used in formulating the catalysts of this invention include triethyl borane, triisopropyl borane, tributyl borane, triisobutyl borane, tri-2-hexyl borane, tri-2-methyl-1-butyl borane, tri-3-methyl-3-pentyl borane, tricyclohexyl borane, tri-4-methyl cyclohexyl borane, tri-beta-pinyl borane, tribenzyl borane, triphenyl borane, tri-o-m- or p-tolyl boranes, the various trixylyl boranes, tri-p-cumenyl borane, tri-2-phenylethyl borane, di-2-methyl-1-butyl boron hydride, di-alpha-pinyl boron hydride, dicyclohexyl boron hydride, di-sec-hexyl boron hydride, di-alpha-naphthyl boron hydride, di-beta-naphthyl boron hydride, dibenzyl boron hydride, di-3-methyl-2-butyl boron hydride (i.e., bis-3-methyl-2-butyl borane), diethyl boron hydride (i.e., tetraethyl diborane), methyl boron dihydride (i.e., dimethyl diborane), phenyl boron dihydride, benzyl boron dihydride, and the like, including analogous compounds of the polymeric boranes, such as penta- and decaborane. In general, such organoboranes will contain up to about 30 carbon atoms in each organic radical contained therein.

Exemplary of the peroxides which may be used in formulating the present catalysts are such compounds as the tert-alkyl hydroperoxides, the tert-aralkyl hydroperoxides, the di-tert-alkyl peroxides, and the diaroyl peroxides, all of which contain in general up to about 30 carbon atoms in the molecule. Specific examples of such compounds include tert-butyl hydroperoxide; tert-amyl hydroperoxide; 1,1-diethylpropyl hydroperoxide; 1,1,2-trimethylpropyl hydroperoxide; 1,1,2,2 - tetramethylpropyl hydroperoxide; 1,1,3,3 - tetramethyl-butyl hydroperoxide; $\alpha,\alpha$ - dimethylbenzyl hydroperoxide (i.e., cumene hydroperoxide); $\alpha$ - methyl - $\alpha$ - ethylbenzyl hydroperoxide; $\alpha,\alpha$ - diphenylethyl hydroperoxide; tri-phenylmethyl hydroperoxide; di-tert-butyl peroxide; tert-butyl-tert-amyl peroxide; di-tert-amyl peroxide; di-(1,1,3,3-tetramethyl butyl) peroxide; dibenzoyl peroxide; di-p-toluoyl peroxide; bis-(m-chloro benzoyl) peroxide; bis-(p-chlorobenzoyl) peroxide; bis-(p-bromobenzoyl) peroxide; bis-(p-methoxybenzoyl) peroxide; bis-(p-cyanobenzoyl) peroxide; bis-(p-nitrobenzoyl) peroxide; $\beta,\beta'$-(dinaphthoyl) peroxide; Decalin hydroperoxide (i.e., decahydronaphthalene hydroperoxide); bis-(1-hydroxycyclohexyl) peroxide; methane hydroperoxide; 1-hydroxyheptaldehyde peroxide; methyl anyl ketone hydroperoxide; cyclohexanone peroxide; lauroyl peroxide, and the like. Another very suitable peroxide compound is hydrogen peroxide.

Air or other suitable oxygen-containing gases may be used in conjunction with or in lieu of such peroxide compounds. Generally, the use of air is most preferable.

The concentrations of catalysts utilized in the practice of this invention may be varied so long as the relative ratio of the elemental boron to elemental oxygen falls within the ranges discussed hereinabove. Generally speaking, the amount of organoboron ingredient charged to the polymerization system will range from about 0.005 to about 0.5 mole percent based upon the total quantity of ethylene and vinyl chloride present in the system. Generally speaking, it is preferred to utilize concentrations ranging from about 0.02 to about 0.2 mole percent of the organo-boron compound relative to the total moles of the monomers being introduced into the polymerization zone.

The polymerization times—i.e., the time during which the mixtures of monomers are allowed to remain in contact with the catalyst—do not appear to be particularly critical and thus may be varied to suit the needs of the occasion. Generally speaking, polymerization times ranging from 10 or 20 minutes up to about 6 to 18 hours may be used, depending upon the polymerization temperature, the catalyst concentration, the amount of recycle used, if any, and the mode of operation. In general, it is preferred to use times ranging from about 1 to about 4 hours, especially when conducting the process of this invention in a continuous operation.

The copolymers of this invention are suitable for use in the preparation of films, plastic sheets, funicular structures, bristles, fibers, wire coatings, packaging materials, and the like. In general, the copoylmers of this invention are processed and handled in much the same manner as conventional plasticized polyvinyl chloride.

What is claimed is:

1. A process for producing vinyl chloride-ethylene copolymers comprising (A) from about 78 to about 91 weight percent vinyl chloride and (B) from about 9 to about 22 weight percent ethylene having an inherent viscosity at 25° C. of from about 0.9 to about 1.7 when dissolved in cyclohexanone at a concentration of 0.1 gram per 100 ml. an ASTM brittle temperature as low as —120° F., and an ASTM tensile strength of up to about 4000 p.s.i. which comprises copolymerizing ethylene and vinyl chloride at a temperature in the range of from about —25° C. to about 10° C. at a pressure in the range of from about 2,000 to about 30,000 p.s.i., in the presence of a polymerization catalyst comprising the product of reaction between an organoborane and at least one member of the group consisting of molecular oxygen and peroxides; said organoborane catalyst being selected from the group consisting of $R_3B$, $R_2BH$, and $RBH_2$ wherein R is a hydrocarbon group containing up to about 30 carbon atoms and is selected from the group consisting of alkyl, cycloalkyl, aryl, aralkyl, and alkaryl groups.

2. The process of claim 1 wherein the polymerization catalyst comprises the product of reaction between an organoborane and at least one member of the group consisting of molecular oxygen and peroxides in proportions equivalent to an atomic ratio, elemental boron-to-elemental oxygen, of from 0.25:1 to about 15:1.

3. The process of claim 1 wherein the mole ratio of ethylene to vinyl chloride is from about 1:1 to about 4.5:1.

4. The process of claim 1 wherein the copolymerization is conducted at a temperature of from about 0° C. to 6° C. and at a pressure of from about 2,900 to about 3,000 p.s.i., in the presence of a polymerization catalyst comprising trialkylborane and molecular oxygen in proportions equivalent to an atomic ratio, elemental boron-to-elemental oxygen of 2:1; the mole ratio of the ethylene to vinyl chloride being 2.4:1.

5. The process of claim 4 wherein the trialkylborane is triethylborane.

6. The process of claim 1 wherein the polymerization catalyst utilized is the product of reaction between a trialkylborane and lauroyl peroxide.

7. The process of claim 1 wherein the polymerization catalyst utilized is the product of reaction between a trialkylborane and molecular oxygen.

8. The process of claim 1 wherein the polymerization is conducted at a temperature in the range of —20° C. and 0° C. and the pressure is in the range of 12,000 to about 13,000 p.s.i.

9. The process of claim 1 wherein the polymerization is conducted at a temperature in the range of from about —20° C. to about 10° C. and at a pressure of from 4,000 to about 15,000 p.s.i.

10. The process of claim 9 wherein the polymerization is conducted at a pressure in the range of from about 12,000 to about 14,300 p.s.i.

References Cited

UNITED STATES PATENTS

| 2,422,392 | 6/1947 | Brubaker et al. | 260—87.5 |
| 2,497,291 | 2/1950 | Brubaker et al. | 260—87.5 |
| 2,985,633 | 5/1961 | Welsh | 260—87.5 |
| 3,051,689 | 8/1962 | Zutty | 260—87.5 |

OTHER REFERENCES

Ridgeway: Modern Plastics Encyclopedia 38, 145 (1961).

Flory: Principles of Polymer Chemistry, Cornell University Press, Ithaca, N.Y. (1953), OD281, P6F66 (pp. 133 and 145 relied on).

Stille: Introduction to Polymer Chemistry, John Wiley and Sons, Inc., New York (1962), QD281, PS7 (p. 25 relied on).

JOSEPH L. SCHOFER, Primary Examiner

JOHN A. DONAHUE, Jr., Assistant Examiner